No. 814,569. PATENTED MAR. 6, 1906.
L. N. STEWART.
ATTACHMENT FOR LISTERS, PLOWS, AND THE LIKE.
APPLICATION FILED JULY 17, 1905.

Witnesses

Inventor
Lemuel N. Stewart.

By
R. H. & A. B. Lacey, Attorneys

UNITED STATES PATENT OFFICE.

LEMUEL N. STEWART, OF AGENCY, MISSOURI.

ATTACHMENT FOR LISTERS, PLOWS, AND THE LIKE.

No. 814,569. Specification of Letters Patent. Patented March 6, 1906.

Application filed July 17, 1905. Serial No. 270,049.

*To all whom it may concern:*

Be it known that I, LEMUEL N. STEWART, a citizen of the United States, residing at Agency, in the county of Buchanan and State of Missouri, have invented certain new and useful Improvements in Attachments for Listers, Plows, and the Like, of which the following is a specification.

This invention relates to improvements in agricultural implements, and embodies, primarily, a novel attachment for listers, plows, or the like.

As is well known, listed corn-rows are usually about three and one-half feet wide, and the share of the lister as it is advanced over the field cuts into about fourteen inches of the row, leaving a large ridge about twenty-eight inches wide of solid earth and a little loose earth on top. The side of this ridge is bare and hard and promotes the growth of weeds and grass and the like, which it is almost impossible to destroy before the crop is large enough to cultivate. By this time such weeds and foreign growth are sufficiently large to smother the crop, and if it is wet weather it is practically impossible to exterminate the same, so that a crop is often lost. The invention hereinafter set forth is designed to pulverize the sides of the ridge which has been before described for a distance farther out than effected by the share of the lister and throws the dirt over against the moldboard, which latter throws it out or back. The invention thus reduces the size of the ridge formed and leaves plenty of loose dirt where before the dirt was hard, conducive to foreign growth, the pulverization accomplishing the killing of the foreign growth and obviating likelihood of loss of the crop in the manner above described.

For a full description of the invention and the merits thereof and also to acquire a knowledge of the details of construction of the means for effecting the result reference is to be had to the following description and accompanying drawings, in which—

Figure 1:
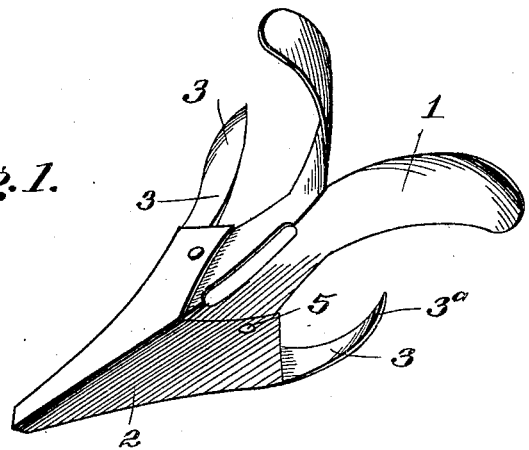
Figure 2:
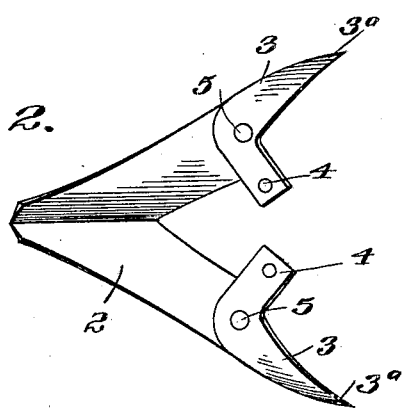
Figure 3:
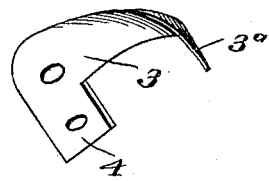

Figure 1 is a perspective view showing the invention applied to the share and double moldboard of an ordinary type of lister. Fig. 2 is a bottom plan view of the share, showing the pulverizing blades or knives applied thereto. Fig. 3 is a detail perspective view of one of the pulverizing blades or knives.

Corresponding and like parts are referred to in the following description and indicated in all the views of the drawings by the same reference characters.

Specifically describing the invention, the same resides in the provision of pulverizing blades or knives which operate from opposite sides of the share and in advance of the moldboard.

The numeral 1 designates the moldboard, which is of the common double type. The numeral 2 denotes the share, and the numeral 3 the pulverizing blades or knives. Ordinarily the share 2 is connected with the moldboard by means of irons, bolts, or otherwise secured to the parts. When the invention is used, however, and it will be understood that the pulverizing knives or blades comprising the same may be applied to any of the various types of listers, plows, and like implements at present in use, it is preferred that the knives or blades be of such a construction as to form means whereby the moldboard is connected with said share. For the above purpose said knives or blades 3 are provided with integral laterally-extending tangs 4, provided with openings, preferably two in number, through which bolts or fastenings 5 may be passed in order to secure the rear end of the share 2 to the moldboard 1. The outer ends of the tangs 4 project beneath the front extremity of the moldboard 1, and the securing means by which the parts 1, 2, and 3 are attached together is substantial and rigid for all necessary purposes. The pulverizing knives or blades 3 will be made of share-steel of fine grade, and the outermost edges will be sharpened. Each of the blades or knives is so arranged with reference to the adjacent side of the share, curving outwardly and rearwardly therefrom, as to relieve the rear end of the share of much of the wear which would otherwise be incident thereto and which is usually greatest at this portion thereof. The knives 3 extend outwardly and rearwardly, gradually curving upwardly, as shown at $3^a$, and tapering near their upper extremities, terminating in a point, or nearly so. The curved formation of the knives 3 is such that they tend to move under the soil or earth and throw the dirt to the moldboard 1, which latter throws it outward and back again in a manner which will be obvious. The knives prevent the share 2 from getting dulled or worn so quickly as at present, as above premised, and said knives are susceptible of ready application and detachment because of the simple construction thereof. It is contemplated that the openings in the knives or blades 3, admitting of attachment thereof to the adjacent parts, shall be elongated, so as to virtually form slots, and thereby permit the knives to be adjusted when the share has become worn.

The use of the attachment so reduces or pulverizes the earth of the ridge which is ordinarily left in the listed rows that the rows need not be cultivated for quite a little while after the crop has been up, thereby accomplishing a saving of time and labor of importance. Further, quite a little loose dirt is thrown about the seed, so as to promote the growth of the crop in an obvious way.

The invention possesses various other advantages which will be apparent to those versed in the art to which it appertains, but which will not be recited herein.

Having thus described the invention, what is claimed as new is—

1. In combination in an agricultural implement embodying a share, a moldboard, and a pulverizing knife or blade attached to the share and provided with a tang projecting toward the moldboard and connected therewith to attach said moldboard to the share, the pulverizing knife or blade being curved upwardly and then inwardly toward the moldboard or opposite to the direction of curvature of the latter.

2. In combination in an agricultural implement embodying a share, a pulverizing blade or knife projecting rearwardly and outwardly from the share and formed with an inwardly-extending tang integral therewith and projecting from said share, and a moldboard attached to the tang of the pulverizing-blade and thereby connected with the share and arranged above the tang of said blade to protect the latter, the pulverizing blade or knife curving upwardly and inwardly toward the moldboard, as specified.

3. In combination, an agricultural implement of the class described embodying a share, a moldboard, and a pulverizing knife or blade connecting the share with the moldboard and operating in advance of the latter.

In testimony whereof I affix my signature in presence of two witnesses.

LEMUEL N. STEWART. [L. S.]

Witnesses:
J. W. FENLEY,
EUGENE W. MILLER.